US009267491B2

(12) United States Patent
Vossler et al.

(10) Patent No.: US 9,267,491 B2
(45) Date of Patent: Feb. 23, 2016

(54) WIND TURBINE ROTOR BLADE HAVING A SPOILER

(71) Applicant: General Electric Company, Schenectady, NY (US)

(72) Inventors: Alexander William Vossler, Greenville, SC (US); Aaron A. Yarbrough, Clemson, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 13/933,549

(22) Filed: Jul. 2, 2013

(65) Prior Publication Data
US 2015/0010400 A1 Jan. 8, 2015

(51) Int. Cl.
*F03D 7/02* (2006.01)
*F03D 1/06* (2006.01)

(52) U.S. Cl.
CPC ............ *F03D 7/0252* (2013.01); *F03D 1/0675* (2013.01); *F03D 7/022* (2013.01); *F05B 2240/31* (2013.01)

(58) Field of Classification Search
CPC . F03D 7/0232; F03D 7/0252; F05B 2240/31; F05B 2260/901
USPC .......................................................... 416/23
See application file for complete search history.

(56) References Cited

U.S. PATENT DOCUMENTS

| 3,144,220 | A | 8/1964 | Kittelson |
| 3,360,218 | A | 12/1967 | Miller |
| 4,039,161 | A | 8/1977 | Bauer |
| 4,082,479 | A | 4/1978 | Rangi et al. |
| 4,160,170 | A | 7/1979 | Harner et al. |
| 4,180,372 | A | 12/1979 | Lippert, Jr. |
| 4,189,648 | A | 2/1980 | Harner |
| 4,193,005 | A | 3/1980 | Kos et al. |
| 4,204,805 | A | 5/1980 | Bolie |

(Continued)

FOREIGN PATENT DOCUMENTS

| DE | 196 29 168 C1 | 10/1997 |
| DE | 10 2004 005 169 B3 | 11/2005 |

(Continued)

OTHER PUBLICATIONS

Brochure—WM 17S from Wind Matic.

(Continued)

*Primary Examiner* — Nathaniel Wiehe
*Assistant Examiner* — Michael Sehn
(74) *Attorney, Agent, or Firm* — Dority & Manning, P.A.

(57) ABSTRACT

A rotor blade for a wind turbine is disclosed. The rotor blade may generally include a shell having a pressure side and a suction side. The shell may define an outer surface along the pressure and suction sides over which an airflow travels. The rotor blade may also include a spoiler having a fixed end and a free end. The fixed end is connected to the outer surface so as to enable a hinge action, such as a living hinge. The free end includes a top flange and a bottom flange configured to engage opposite sides of the shell and is pivotal relative to the fixed end between a recessed position and an elevated position. The free end has a range of motion limited by contact of the top flange and the bottom flange with the shell. Further, the spoiler is configured to separate the airflow from the outer surface when the spoiler is in the elevated position.

20 Claims, 4 Drawing Sheets

(56) References Cited

U.S. PATENT DOCUMENTS

| | | |
|---|---|---|
| 4,247,252 A | 1/1981 | Seki et al. |
| 4,355,955 A | 10/1982 | Kisovec |
| 4,422,820 A | 12/1983 | Kirsch et al. |
| 4,431,375 A | 2/1984 | Carter, Jr. et al. |
| 4,435,646 A | 3/1984 | Coleman et al. |
| 4,500,257 A | 2/1985 | Sullivan |
| 4,504,192 A | 3/1985 | Cyrus et al. |
| 4,522,561 A | 6/1985 | Carter, Jr. et al. |
| 4,522,564 A | 6/1985 | Carter, Jr. et al. |
| 4,557,666 A | 12/1985 | Baskin et al. |
| 4,565,929 A | 1/1986 | Baskin et al. |
| 4,575,309 A | 3/1986 | Brown |
| 4,613,282 A | 9/1986 | Wood |
| 4,659,284 A | 4/1987 | Wood |
| 4,664,596 A | 5/1987 | Wood |
| 4,692,095 A | 9/1987 | Lawson-Tancred |
| 4,715,782 A | 12/1987 | Shimmel |
| 4,815,936 A | 3/1989 | Stoltze et al. |
| 5,106,265 A | 4/1992 | Holzem |
| 5,253,828 A | 10/1993 | Cox |
| 5,354,175 A | 10/1994 | Coleman et al. |
| 5,391,926 A | 2/1995 | Staley et al. |
| 5,527,151 A | 6/1996 | Coleman et al. |
| 5,527,152 A | 6/1996 | Coleman et al. |
| 5,570,859 A | 11/1996 | Quandt |
| 5,907,192 A | 5/1999 | Lyons et al. |
| 6,105,904 A | 8/2000 | Lisy et al. |
| 6,254,197 B1 | 7/2001 | Lading et al. |
| 6,265,785 B1 | 7/2001 | Cousineau et al. |
| 6,420,795 B1 | 7/2002 | Mikhail et al. |
| 6,427,948 B1 | 8/2002 | Campbell |
| 6,566,764 B2 | 5/2003 | Rebsdorf et al. |
| 6,784,566 B2 | 8/2004 | Thomas |
| 6,819,086 B2 | 11/2004 | Wobben |
| 6,856,038 B2 | 2/2005 | Rebsdorf et al. |
| 6,856,040 B2 | 2/2005 | Feddersen et al. |
| 6,933,625 B2 | 8/2005 | Feddersen et al. |
| 7,015,595 B2 | 3/2006 | Feddersen et al. |
| 7,028,954 B2 | 4/2006 | Van Dam et al. |
| 7,063,501 B2 | 6/2006 | Selsam |
| 7,075,192 B2 | 7/2006 | Bywaters et al. |
| 7,109,600 B1 | 9/2006 | Bywaters et al. |
| 7,119,453 B2 | 10/2006 | Bywaters et al. |
| 7,183,665 B2 | 2/2007 | Bywaters et al. |
| 7,218,011 B1 | 5/2007 | Edenfeld |
| 7,276,807 B2 | 10/2007 | Luetze et al. |
| 7,293,959 B2 | 11/2007 | Pedersen et al. |
| 7,303,369 B2 | 12/2007 | Rowan et al. |
| 7,321,221 B2 | 1/2008 | Bucker et al. |
| 7,332,837 B2 | 2/2008 | Ward et al. |
| 7,397,145 B2 | 7/2008 | Struve et al. |
| 7,419,356 B2 | 9/2008 | Stiesdal |
| 7,431,567 B1 | 10/2008 | Bevington et al. |
| 7,434,636 B2 | 10/2008 | Sutherland |
| 7,436,083 B2 | 10/2008 | Shibata et al. |
| 7,458,776 B2 | 12/2008 | Llorente Gonzalez et al. |
| 7,471,007 B2 | 12/2008 | Bucker et al. |
| 7,488,155 B2 | 2/2009 | Barbu et al. |
| 7,502,215 B2 | 3/2009 | Krug et al. |
| 7,513,742 B2 | 4/2009 | Rogall et al. |
| 7,585,157 B2 | 9/2009 | Quell et al. |
| 7,591,635 B2 | 9/2009 | Ryu et al. |
| 7,592,766 B2 | 9/2009 | Patel et al. |
| 7,604,461 B2 | 10/2009 | Bonnet |
| 7,617,741 B1 | 11/2009 | Lowe-Wylde |
| 7,632,068 B2 | 12/2009 | Bak et al. |
| 7,643,928 B2 | 1/2010 | Soucy |
| 7,677,862 B2 | 3/2010 | Boatner |
| 7,709,972 B2 | 5/2010 | Arinaga et al. |
| 7,745,948 B2 | 6/2010 | Kerber |
| 7,786,608 B2 | 8/2010 | Menke |
| 7,802,469 B2 | 9/2010 | Staedler et al. |
| 7,808,121 B1 | 10/2010 | Glynn |
| 7,816,801 B2 | 10/2010 | Guang et al. |
| 7,821,147 B2 | 10/2010 | Du Bois |
| 7,822,524 B2 | 10/2010 | Tabata et al. |
| 7,848,858 B2 | 12/2010 | Tabata et al. |
| 7,869,976 B2 | 1/2011 | Larsen et al. |
| 7,884,493 B2 | 2/2011 | Buskirk et al. |
| 7,887,284 B2 | 2/2011 | Merswolke et al. |
| 7,891,941 B2 | 2/2011 | Bevington et al. |
| 7,941,259 B2 | 5/2011 | Tabata et al. |
| 7,944,067 B2 | 5/2011 | Kammer et al. |
| 7,948,100 B2 | 5/2011 | Nies et al. |
| 8,047,233 B2 | 11/2011 | Clingman |
| 2006/0140760 A1 | 6/2006 | Saddoughi et al. |
| 2007/0231151 A1 | 10/2007 | Herr et al. |
| 2008/0029255 A1 | 2/2008 | Orlandi |
| 2008/0175711 A1 | 7/2008 | Godsk |
| 2009/0068018 A1 | 3/2009 | Corten |
| 2009/0074574 A1 | 3/2009 | Godsk et al. |
| 2009/0280009 A1 | 11/2009 | Brock |
| 2009/0284016 A1 | 11/2009 | Van Dam et al. |
| 2009/0285682 A1 | 11/2009 | Baker et al. |
| 2010/0104436 A1 | 4/2010 | Herr et al. |
| 2011/0223033 A1 | 9/2011 | Wang et al. |
| 2012/0134803 A1* | 5/2012 | McGrath ............... F03D 7/0252 416/1 |

FOREIGN PATENT DOCUMENTS

| | | |
|---|---|---|
| DE | 10 2009 026 131 B3 | 11/2010 |
| EP | 0 350 425 A1 | 1/1990 |
| EP | 0 761 964 A1 | 3/1997 |
| EP | 0 947 693 | 10/1999 |
| EP | 1 674 723 | 6/2006 |
| EP | 1 772 623 | 4/2007 |
| EP | 1 896 323 | 3/2008 |
| EP | 1 944 505 | 7/2008 |
| EP | 2 085 610 A1 | 8/2009 |
| EP | 2 098 721 | 9/2009 |
| JP | 4029063 | 1/1992 |
| WO | 00/15961 | 3/2000 |
| WO | 01/16482 | 3/2001 |
| WO | 2007/005687 | 1/2007 |
| WO | 2007/065434 | 6/2007 |
| WO | 2007/140771 | 12/2007 |
| WO | 2008/113349 | 9/2008 |
| WO | 2008/113350 | 9/2008 |

OTHER PUBLICATIONS

Brochure—WM 15S from Wind Matic.
Article—"Wind Turbine Test, Wind Matic WM 15S", Riso National Laboratory, Denmark, Jul. 1986.
van Dam, C.P.; "Airfoils for Structures-Passive and Active Load Control for Wind Turbine Blades", Department of Mechanical and Aeronautical Engineering, University of California-Davis.
Vronsky, T.; "High Performance Cost-Effective Large Wind Turbine Blades Using Air-Jet Vortex Generators", ETSU W/41/00541/REP, 2000.

* cited by examiner

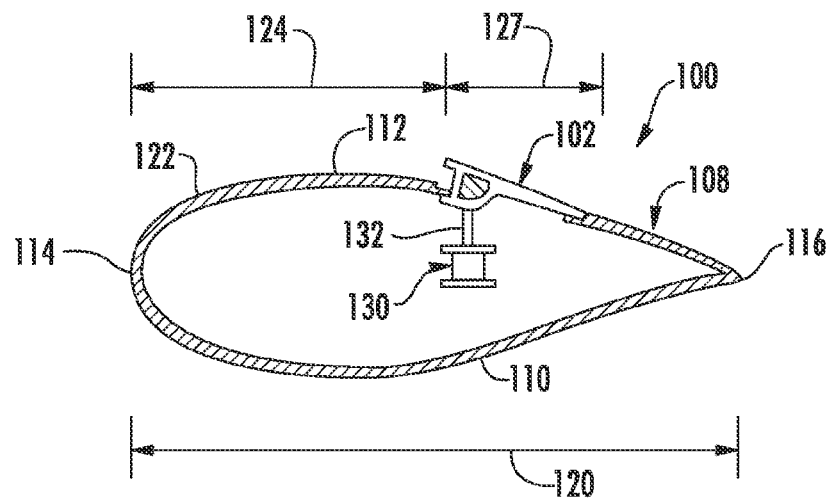
FIG. 3
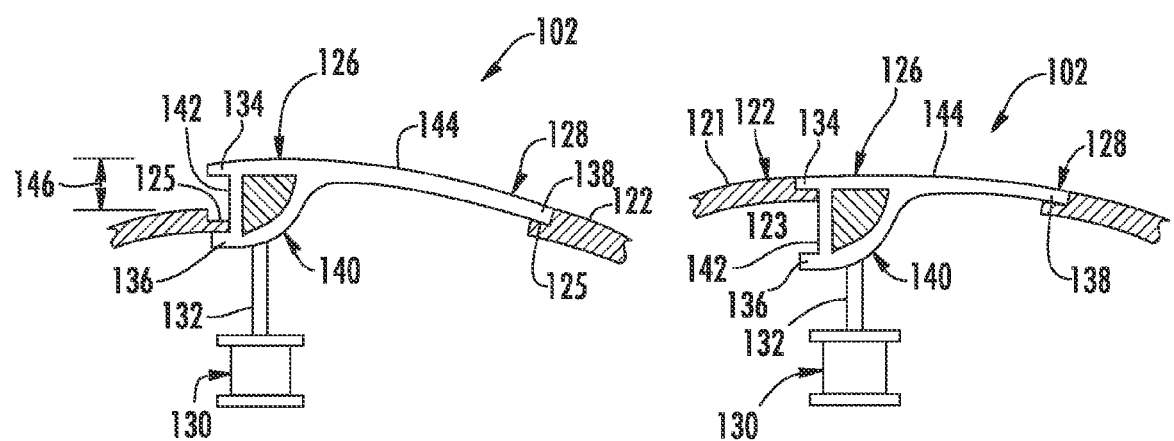
FIG. 4
FIG. 5

WIND TURBINE ROTOR BLADE HAVING A SPOILER

FIELD OF THE INVENTION

The present subject matter relates generally to wind turbines, and particularly to a wind turbine rotor blade having a spoiler.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source. However, as rotor blade sizes increase, so do the loads transferred through the blades to other components of the wind turbine (e.g., the wind turbine hub and other components). For example, longer rotor blades result in higher loads due to the increased mass of the blades as well as the increased aerodynamic loads acting along the span of the blade. Such increased loads can be particularly problematic in high-speed wind conditions, as the loads transferred through the rotor blades may exceed the load-bearing capabilities of other wind turbine components.

Certain surface features, such as spoilers, are known that may be utilized to separate the flow of air from the outer surface of a rotor blade, thereby reducing the lift generated by the blade and reducing the loads acting on the blade. However, these surface features are typically designed to be permanently disposed along the outer surface of the rotor blade. As such, the amount of lift generated by the rotor blade is reduced regardless of the conditions in which the wind turbine is operating.

Additionally, U.S. Pat. No. 4,692,095 describes wind turbine blades with active spoilers on the low pressure side of the blade that rapidly deploy to control an overspeed condition. The spoilers are connected to an electrically operated clutch, which normally holds the spoilers in a flush-mount position. In an overspeed condition, the clutch releases the rope and the spoiler opens via a spring. The spoiler, however, opens against the force of the airflow over the blade and the spring must be of sufficient size and strength to hold the spoiler open as the rotor slows. Likewise, the clutch must be of sufficient size and power to retract the spoiler against the force of the spring.

Accordingly, the industry would benefit from a wind turbine rotor blade having a simple and cost-effective actuatable spoiler to reduce lift. More specifically, a rotor blade having an actuatable spoiler with a living hinge would be advantageous.

BRIEF DESCRIPTION OF THE INVENTION

Aspects and advantages of the invention will be set forth in part in the following description, or may be obvious from the description, or may be learned through practice of the invention.

In one aspect, a rotor blade for a wind turbine having a shell with a pressure side and a suction side and one or more spoilers is disclosed. The one or more spoilers may be spaced apart along a span of the rotor blade. The shell defines an outer surface along the pressure and suction sides over which an airflow travels. The spoiler includes a fixed end and a free end. The fixed end is connected to the outer surface so as to enable a hinge action. In one embodiment, the hinge action may be a living hinge. The free end includes a top flange and a bottom flange configured to engage opposite sides of the shell and is pivotal relative to the fixed end between a recessed position and an elevated position. Further, the free end has a range of motion limited by contact of the top flange and the bottom flange with the shell. As such, the free end is configured to separate the airflow from the outer surface when in the elevated position.

In another embodiment, the spoiler further comprises a wedge portion having a front face that tapers from the front face to the fixed end. Further, the front face is defined by the top and bottom flanges. As such, the front face may be configured to separate the airflow from the outer surface when the spoiler is in the elevated position. In still another embodiment, the spoiler may include a top side defining an aerodynamic surface generally corresponding to an aerodynamic profile of the outer surface. Further, the outer surface may include one or more recesses configured to position the spoiler such that the top side of the spoiler is generally aligned with the outer surface when the spoiler is in a recessed position.

In yet another embodiment, the rotor blade may include an actuator disposed within the shell. Further, the actuator may be configured to pivot the free end of the spoiler between the recessed position and the elevated position.

In further embodiments, a height may be defined between the top flange and the outer surface when the spoiler is in the elevated position. The height may range from about 1% to about 4% of the chord defined at a span-wise location of the spoiler. Further, the spoiler may be disposed a chord-wise distance from a leading edge of the shell ranging from about 10% to about 50% of the chord defined at a span-wise location of the spoiler. Moreover, the spoiler may be disposed a span-wise distance from a blade root of the rotor blade from about 50% to about 90% of span defined by the blade root and a blade tip.

In still further embodiments, the spoiler may include a flexible material. For example, the flexible material may be a laminate material or similar. In yet another embodiment, the fixed end may be affixed to the outer surface by an adhesive.

In another aspect, the present subject matter discloses a wind turbine including a tower and a nacelle mounted atop the tower. The wind turbine may also include a hub coupled to the nacelle and a plurality of rotor blades extending outwardly from the hub. At least one of the rotor blades may include a shell having a pressure side and suction side. The shell may define an outer surface along the pressure and suction sides over which an airflow travels. The rotor blade may also include a spoiler including a fixed end and a free end. The fixed end is connected to the outer surface so as to enable a hinge action. In one embodiment, the hinge action may be a living hinge. Further, the free end may include a top flange and a bottom flange configured to engage opposite sides of the shell and is pivotal relative to the fixed end between a recessed position and an elevated position. As such, the free end has a range of motion limited by contact of the top flange and the bottom flange with the shell. Further, the free end is configured to separate the airflow from the outer surface when in the elevated position. The spoiler may be further configured in accordance with any one of the embodiments set forth above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 illustrates a cross-sectional view of an embodiment of a wind turbine rotor blade with a spoiler according to the present disclosure;

FIG. 4 illustrates a cross-sectional view of an embodiment of a spoiler and actuator in a recessed position according to the present disclosure;

FIG. 5 illustrates a cross-sectional view of an embodiment of a spoiler and actuator in an elevated position according to the present disclosure; and, FIG. 6 illustrates a cross-sectional view of another embodiment of a wind turbine rotor blade with a spoiler according to the present disclosure.

DETAILED DESCRIPTION OF THE INVENTION

Figure 1:
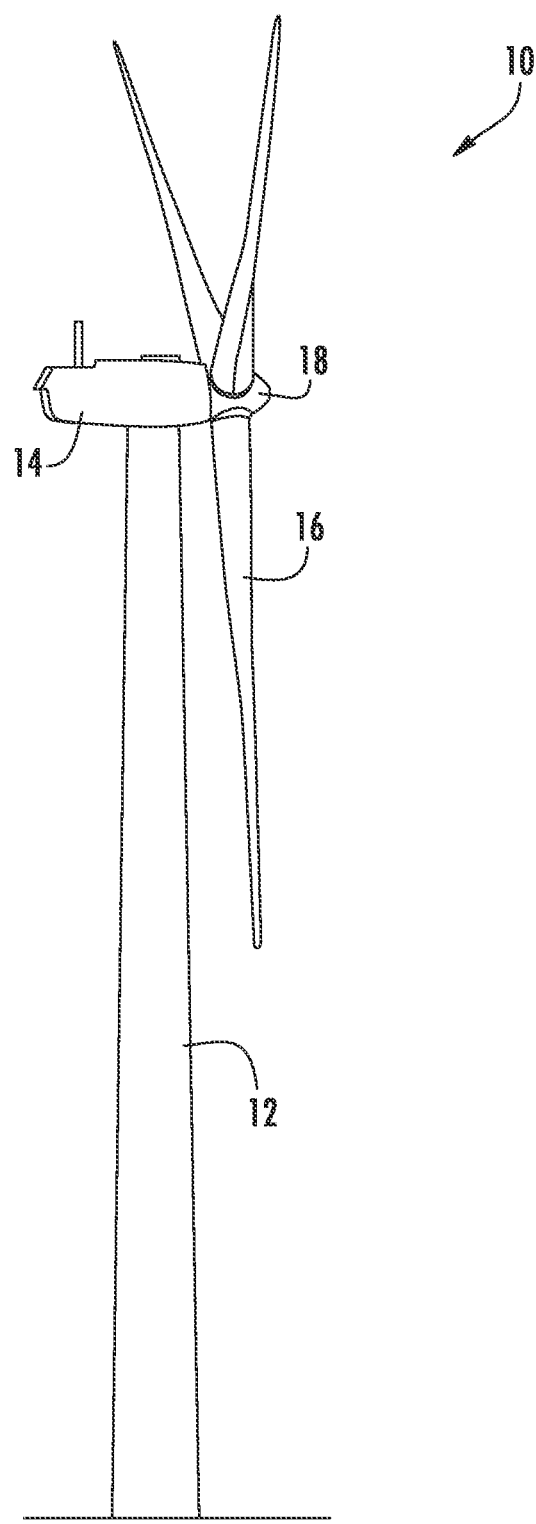
FIG. 1 illustrates a perspective view of a wind turbine with rotor blades in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the view of FIG. 1 is provided for illustrative purposes only to place the present subject matter in an exemplary field of use. Thus, one of ordinary skill in the art should readily appreciate that the present subject matter need not be limited to any particular type of wind turbine configuration.

Figure 2:
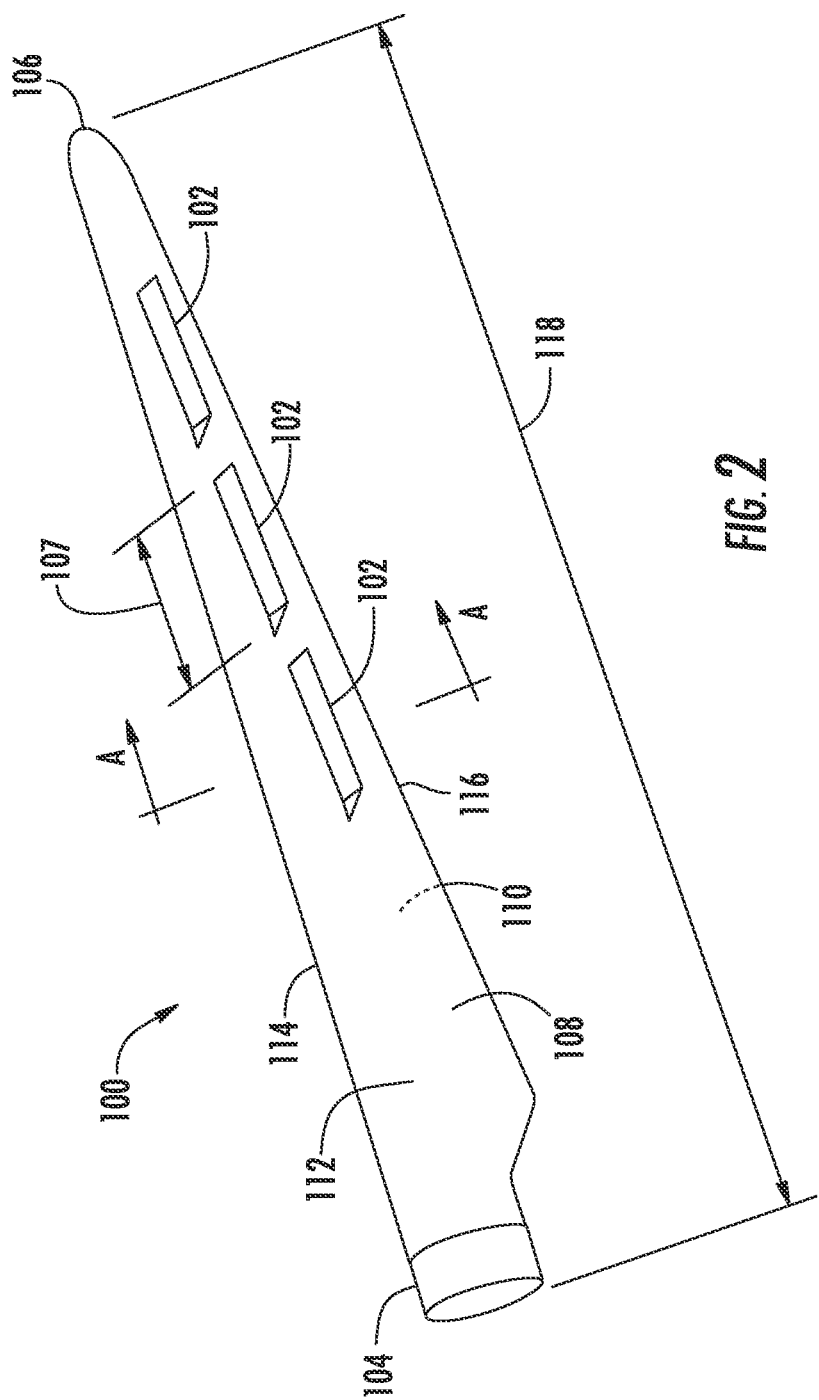
FIG. 2 illustrates a longitudinal view of a wind turbine rotor blade having a plurality of spoilers aligned span-wise along the blade according to the present disclosure.

Referring now to FIGS. 2-5, there is illustrated one embodiment of a rotor blade 100 having one or more spoilers 102 in accordance with aspects of the present subject matter. In particular, FIG. 2 illustrates a perspective view of the rotor blade 100 having a plurality of spoilers 102 spaced apart thereon. FIG. 3 illustrates a cross-sectional view of the rotor blade 100 shown in FIG. 2 taken along the sectional line A-A. FIG. 4 illustrates a partial, cross-sectional view of the rotor blade 100 shown in FIG. 3, particularly illustrating the spoiler 102 in an elevated position. Additionally, FIG. 5 illustrates another partial, cross-sectional view of the rotor blade 100 shown in FIG. 3, particularly illustrating the spoiler 102 in a recessed position.

In general, the rotor blade 100 may include a blade root 104 configured for mounting the rotor blade 100 to the hub 18 of the wind turbine 10 (FIG. 1) and a blade tip 106 disposed opposite the blade root 104. A shell 108 of the rotor blade 100 may generally be configured to extend between the blade root 104 and the blade tip 106 and may serve as the outer casing/covering of the blade 100. In several embodiments, the shell 108 may define a substantially aerodynamic profile, such as by defining a symmetrical or cambered airfoil-shaped cross-section. As such, the shell 108 may define a pressure side 110 and a suction side 112 extending between a leading edge 114 and a trailing edge 116. Further, the rotor blade 100 may have a span 118 defining the total length between the blade root 104 and the blade tip 106 and a chord 120 defining the total length between the leading edge 114 and the trailing edge 116. As is generally understood, the chord 120 may vary in length with respect to the span 118 as the rotor blade 100 extends from the blade root 104 to the blade tip 106.

In several embodiments, the shell 108 of the rotor blade 100 may be formed as a single, unitary component. Alternatively, the shell 108 may be formed from a plurality of shell components. For example, the shell 108 may be manufactured from a first shell half generally defining the pressure side 110 of the rotor blade 100 and a second shell half generally defining the suction side 112 of the rotor blade 100, with the shell halves being secured to one another at the leading and trailing edges 114, 116 of the blade 100. Additionally, the shell 108 may generally be formed from any suitable material. For instance, in one embodiment, the shell 108 may be formed entirely from a laminate composite material, such as a carbon fiber reinforced laminate composite or a glass fiber reinforced laminate composite. Alternatively, one or more portions of the shell 108 may be configured as a layered construction and may include a core material, formed from a lightweight material such as wood (e.g., balsa), foam (e.g., extruded polystyrene foam) or a combination of such materials, disposed between layers of laminate composite material.

It should be appreciated that the rotor blade 100 may also include one or more internal structural components. For example, in several embodiments, the rotor blade 100 may include one or more shear webs (FIG. 6) extending between corresponding spar caps (not shown). However, in other embodiments, the rotor blade 100 of the present disclosure may have any other suitable internal configuration.

Referring still to FIGS. 2-5, the rotor blade 100 may also include one or more spoilers 102 configured to be selectively elevated from within the shell 108 so as to reduce lift of the rotor blade 100. In particular, the spoiler 102 may be pivotal between an elevated position (FIGS. 2-4), wherein at least a portion of the spoiler 102 is positioned outside the shell 108, and a recessed position (FIG. 5), wherein the spoiler 102 is generally aligned with or disposed below an outer surface 122 of the shell 108. As such, at times of increased loading on the rotor blade 100 (e.g., during operation in high-speed wind conditions), the spoiler 102 may be pivoted to the elevated position in order to separate the air flowing over the rotor blade 100 from the outer surface 122 of the shell 108, thereby reducing the lift generated by the blade 100 and decreasing the loads transferred through the blade 100 to other components of the wind turbine 10 (e.g., the wind turbine hub 18 (FIG. 1)). However, when blade loading is not an issue (e.g., in low-speed wind conditions), the spoiler 102 may be moved to and/or remain in the recessed position so as to not affect the performance and/or efficiency of the rotor blade 100.

In general, the rotor blade 100 may be configured to include any number of spoilers 102. For example, in the illustrated embodiment, the rotor blade 100 includes three spoilers 102 spaced apart along the blade 100. However, in alternative embodiments, the rotor blade 100 may include fewer than three spoilers 102, such as one spoiler 102 or two spoilers 102, or greater than three spoilers 102, such as four spoilers 102, five spoilers 102 or more than five spoilers 102. Additionally, each spoiler 102 may generally be disposed at any location on the rotor blade 100. For instance, as shown, each spoiler 102 is positioned on the suction side 112 of the rotor blade 100. In alternative embodiments, each spoiler 102 may be positioned on the pressure side 110 of the rotor blade 100 or may be positioned on each side 110, 112 of the rotor blade 100. Similarly, the spoilers 102 may generally be disposed at any suitable location along the span 118 of the rotor blade 100, such as from generally adjacent the blade root 104 to generally adjacent the blade tip 106. For example, in one embodiment, the spoiler 102 may be disposed a span-wise distance from the blade root 104 from about 50% to about 90% of the span defined by the blade root 104 and the blade tip 106, such as from about 55% of the span.

Moreover, each spoiler 102 may generally be positioned at any suitable location along the chord 120 of the rotor blade 100, such as by being spaced apart from the leading edge 114 of the shell 108 any suitable distance 124. For example, in several embodiments of the present subject matter, each spoiler 102 may be positioned a distance 124 from the leading edge 114 ranging from about 5% to about 90% of the corresponding chord 120 defined at the specific span-wise location of the spoiler 102, such as from 10% of the corresponding chord 120, such as from about 20% of the corresponding chord, and all other sub-ranges therebetween. However, in other embodiments, it should be appreciated that the spoilers 102 may be spaced apart from the leading edge 114 a distance 124 that is less than 5% of the length of the corresponding chord 120 or that is greater than 90% of the length of the corresponding chord 120. For instance, in one embodiment, the spoilers 102 may be positioned adjacent to the leading edge 114 of the rotor blade 100 or adjacent to the trailing edge 116.

Further, in embodiments in which the rotor blade 100 includes more than one spoiler 102, the spoilers 102 may be spaced apart from one another along the rotor blade 100 in any direction. For instance, in the illustrated embodiment, the spoilers 102 are spaced apart from one another in the span-wise direction. In other embodiments, the spoilers 102 may be spaced apart from one another in the chord-wise direction or in both the span-wise and chord-wise directions. One of ordinary skill in the art should appreciate that the "chord-wise direction" refers to a direction extending parallel to the chord 120 of the rotor blade 100 and the "span-wise direction" refers to a direction extending parallel to the span 118 of the rotor blade 100.

Additionally, each spoiler 102 may generally extend any suitable length 107 along the rotor blade 100. For instance, in one embodiment, the spoilers 102 may have a length generally equal to the span 118 of the rotor blade 100 such that each spoiler 102 extends from generally adjacent the blade root 104 to generally adjacent the blade tip 106. In other embodiments, as illustrated in FIG. 2, each spoiler 102 may define a shorter length 107. For example, in one embodiment, each spoiler 102 may define a length that is less than 5 meters (m), such as less than 3 m or less than 2 m and all other sub-ranges therebetween.

Referring particularly now to FIGS. 4 and 5, the spoiler 102 may include a fixed end 128 and a free end 126. As shown, the fixed end 128 is connected to the outer surface 122 so as to enable a hinge action 138. In one embodiment, the fixed end 128 may be affixed to the outer surface 122 using an adhesive, such as adhesive paste, adhesive tape, or over laminate. In another embodiment, the hinge action 138 may be a thin, flexible hinge, such as a living hinge. The term "living hinge" as used herein is generally meant to encompass a thin flexible hinge made from the same material as the two rigid pieces it connects. Further, a living hinge is typically thinned or cut to allow the rigid pieces to bend along the line of the hinge. For example, as illustrated, the living hinge 138 may be a thin, laminate section extending from the fixed end 128 to a wedge portion 140, which will be discussed in more detail below. The living or flexible hinge 138 may be constructed from the same materials as the shell 108 as described herein such that it may bend easily with the blade 100. Alternatively, the living hinge 138 may be constructed from different materials from the shell 108 and may be attached to the shell 108 such that it may bend easily with the blade 100. Accordingly, the living hinge 138 permits the spoiler 102 to easily pivot from a recessed position to an elevated position so as to separate the airflow from the outer surface 122 when the spoiler 102 is in the elevated position. The minimal friction and very little wear in the hinge 138 provides a spoiler 102 that is simple and cost-effective to manufacture.

The free end 126 may also include a top flange 134 and a bottom flange 136 configured to engage opposite sides 121, 123 of the shell 108. As such, the free end 126 may have a range of motion limited by contact of the top flange 134 and the bottom flange 136 with the shell 108. Additionally, the spoiler 102 may include wedge portion 140 positioned between the top flange 134 and the bottom flange 136. The wedge portion 140 may include a front face 142 defined by the top and bottom flanges 134,136 that provides an air block/brake having a height 146 so as to separate the airflow from the outer surface 122 when the spoiler 102 is in the elevated position. Further, the wedge portion 140 may taper from the front face 142 to the fixed end 128. Accordingly, the wedge portion 140 may reduce lifts and loads acting on the blade 100.

The height 146 between the top flange 134 and the outer surface 122 may range from about 20 millimeters (mm) to about 50 mm, such as about 40 mm, such as about 30 mm. Further, the height 146 may range from about 1% to about 4% of the corresponding chord 120 defined at the specific span-wise location of the spoiler 102, such as from about 2% to about 3% of the corresponding chord 120 or from about 1.5% to about 2.5% of the corresponding chord 120 and all other sub-ranges therebetween. Thus, in such embodiments, the ranges of the heights 146 may generally increase as the spoiler 102 is positioned closer to the blade root 104 and may generally decrease as the spoiler 102 is positioned closer to the blade tip 106. In other embodiments, it should be appreciated that the height 146 may be less than 1% of the corresponding chord 120 defined at the specific span-wise location of the spoiler 102 or may be greater than 4% of the corresponding chord 120.

The wedge portion 140 may extend a portion of the width 127 of the spoiler 102 such that most of the width 127 consists of a thin, flexible portion. For example, the wedge portion 140 may extend approximately 25% of the width of the spoiler 102 so as to provide a thin, flexible portion (i.e. living hinge 138) that is approximately 75% of the width 127. Further, the width 127 of the spoiler 102 may range from about 70 mm to about 120 mm, such as about 90 mm, such as about 100 mm. In further embodiments, the wedge portion 140 may be a solid material or may be a hollow material. As such, the wedge portion 140 may be manufactured using the same material as other spoiler 102 components or may be manufactured using different materials. For example, as illustrated, the wedge portion 140 is a hollow material having a foam or similar material disposed therein.

The rotor blade described herein may further include an actuator 130 disposed within the shell 122. In general, the actuator 130 may be configured to pivot the free end 126 between the recessed position and the elevated position. Accordingly, it should be appreciated that the actuator 130 may generally include any suitable device capable of pivoting the free end 126 relative to the fixed end 128. For example, in several embodiments, the actuator 130 may comprise a linear displacement device configured to pivot the free end 126 of the spoiler 102 from a recessed position to an elevated position. Further, the actuator 130 may be configured to pivot the free end 126 of the spoiler 102 so as to vary the height 146 depending on the loads acting on the rotor blade 100. In particular, depending on the magnitude of the blade loading (e.g., the amount of the lift being generated by the rotor blade 100), the actuator 130 may configured to actuate the spoilers 102 to a specific height 146 designed to sufficiently separate the flow of air from the shell 108 so as to achieve the desired load reduction.

In one embodiment, the actuator 130 may comprise a hydraulic, pneumatic or any other suitable type of cylinder configured to elevate a piston rod 132. Thus, as shown in FIGS. 4 and 5, the free end 126 of the spoiler 102 may be attached to the piston rod 132 such that, as the piston rod 132 is actuated, the free end 126 is pivoted relative to the fixed end 128 and is elevated above the outer surface 122. In other embodiments, the actuator 130 may comprise any other suitable device, such as a rack and pinion, a worm gear driven device, a cam actuated device, an electro-magnetic solenoid or motor, other electro-magnetically actuated devices, a scotch yoke mechanism and/or any other suitable device. Additionally, in further embodiments, the spoiler 102 may pivot between the recessed position and the elevated position by gravity, centrifugal force, aerodynamic force, or similar.

It should be appreciated that any suitable number of actuators 130 may be utilized to move each spoiler 102 between the elevated and recessed positions. For instance, in one embodiment, two or more actuators 130 may be coupled to the free end 126 of each spoiler 102 at differing locations along the length 107 of the spoiler 102. In another embodiment, a single actuator 130 may be utilized to pivot the spoiler 102. It should also be appreciated that, although the actuator 130 and spoiler 102 are depicted as being oriented substantially perpendicularly to the outer surface 122 of the shell 108, the actuator 130 and spoiler 102 may generally be configured to have any suitable orientation relative to the shell 108.

Additionally, in several embodiments of the present subject matter, a top side 144 of each spoiler 102 defines an aerodynamic surface generally corresponding to an aerodynamic profile of the outer surface 122 when the spoiler 102 is moved to the recessed position. In such embodiments, it should be appreciated that the top side 144 of each spoiler 102 may be configured to define an aerodynamic profile generally corresponding to the aerodynamic profile of the outer surface 122 of the shell 108 in an area adjacent to the spoiler 102. For example, as shown in FIG. 5, when the spoiler 102 is in the recessed position, the top side 144 of the spoiler 102 may generally be positioned substantially flush with the outer surface 122 of the shell 108. As such, a generally smooth and continuous aerodynamic profile may be defined between the outer surface 122 and the spoiler 102.

More specifically, the outer surface 122 may include one or more recesses 125 configured to position the spoiler 102 such that the top side 144 is generally aligned with the outer surface 122 when the spoiler 102 is in a recessed position. For example, the fixed end 128 and the free end 126 may be positioned in opposing recesses 125 such that the top side 144 remains flush with the outer surface 122 when in a recessed position.

Figure 6:
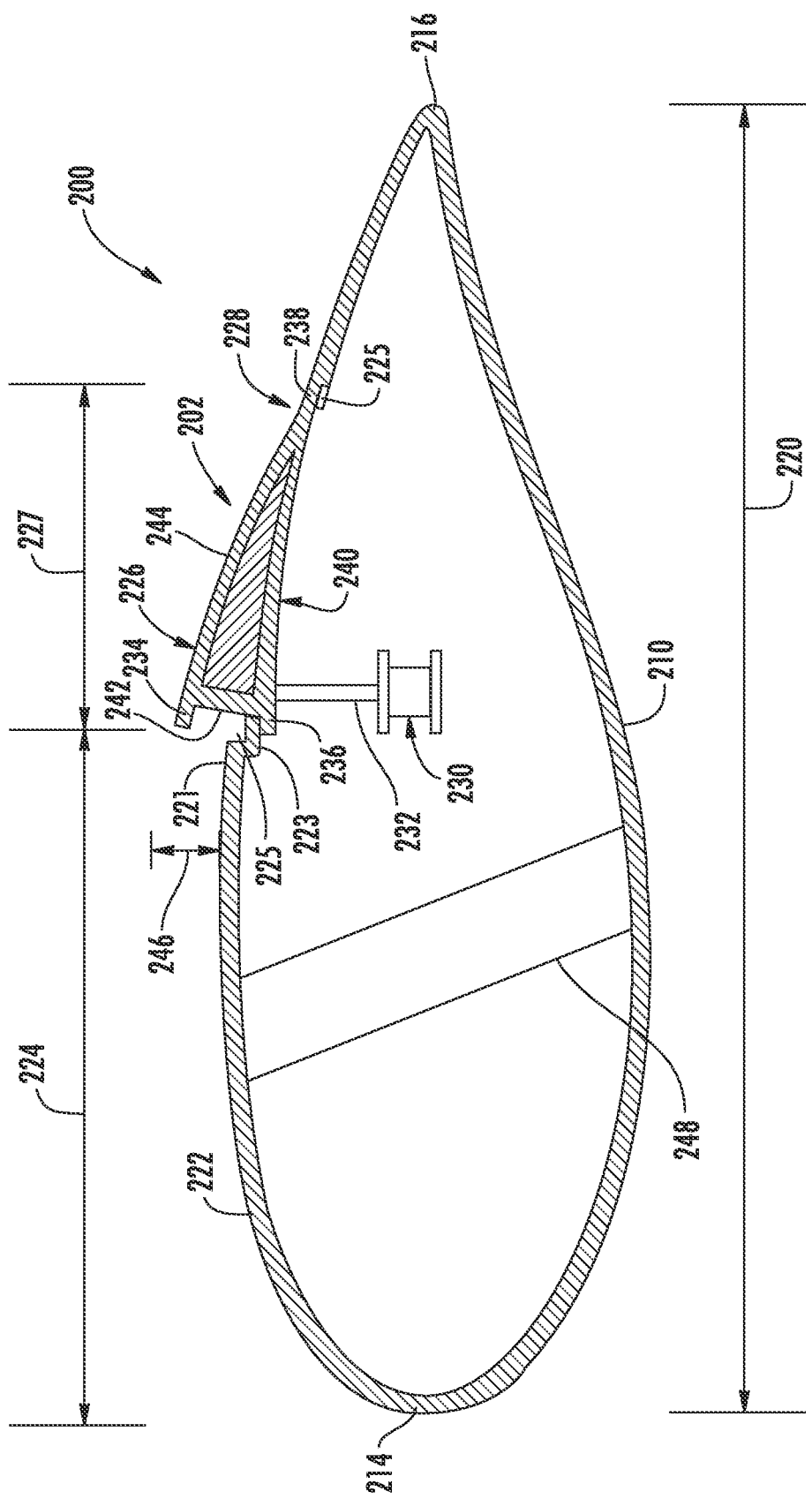

Referring now to FIG. 6, a cross-sectional view of another embodiment of a rotor blade 200 having a spoiler 202 according to the present disclosure is illustrated. In general, the rotor blade 200 may be configured the same as or similar to the rotor blade 100 described above with reference to FIGS. 2-5. Thus, the rotor blade 200 may include a shell 208 having an outer surface 222 and defining a pressure side 210 and a suction side 212 extending between leading and trailing edges 214, 216. Additionally, the spoiler 202 and actuator 230 may generally be configured the same as or similar to the spoiler 102 and actuator 130 described above with reference to FIGS. 2-5. Thus, the spoiler 202 may generally include a fixed end 228 and a free end 226, wherein the fixed end 228 is connected to the outer surface 222 and includes a hinge 238, and wherein the free end 226 is pivotal relative to the fixed end 228 between a recessed position and an elevated position. Further, the free end 226 may include a top flange 234 and a bottom flange 236 configured to engage opposite sides 221, 223 of the shell 108.

The embodiment of FIG. 6, however, shows a different embodiment of the hinge 238 and the wedge portion 240. For example, the wedge portion 140 described above with reference to FIGS. 2-5 includes the front face 142 defined between the top and bottom flanges 134, 136 and tapers from the free end 126 to a portion of the width 127 of the spoiler 102. As shown in FIG. 6, however, the wedge portion 240 extends substantially the entire width 227 of the spoiler 202 and therefore acts as both the air block/brake and the hinge 238. In further embodiments, it should be understood that the present disclosure as described herein may encompass a wedge portion 140, 240 and hinge 138, 238 extending any portion of the width 127, 227 of the spoiler 102.

Further, it should be appreciated that, when the rotor blades 100, 200 include more than one spoiler 102, 202 and/or one or more actuators 130, 230 coupled to the spoilers 102, 202, the actuators 130, 230 may be controlled individually or in groups. For example, it may be desirable to actuate only a portion of the spoilers 102, 202 disposed within the rotor blade 100, 200 in order to precisely control the amount of lift generated by the blade 100, 200. Similarly, it may be desirable to actuate the spoilers 102, 202 to differing heights depending upon on the span-wise location of each of the spoilers 102, 202. It should also be appreciated that any suitable means may be utilized to control the actuators 130, 230. For example, the actuators 130, 230 may be communicatively coupled to a turbine controller (not shown) of the wind turbine 10 or any other suitable control device (e.g. a computer and/or any other suitable processing equipment) configured to control the operation of the actuators 130, 230.

Additionally, in several embodiments of the present subject matter, the disclosed rotor blades 100, 200 may include any suitable means for determining the operating conditions of the blades 100, 200 and/or the wind turbine 10 (FIG. 1). Thus, in one embodiment, one or more sensors (not shown), such as load sensors, position sensors, speed sensors, strain sensors and the like, may be disposed at any suitable location along the rotor blade 100, 200 (e.g., at or adjacent to the blade root 104 (FIG. 2)), with each sensor being configured to measure and/or determine one or more operating conditions of the rotor blade 100, 200. For example, the sensors may be configured to measure the wind speed, the loading occurring at the blade root 104, the deformation of the blade root 104, the rotational speed of the rotor blade 100, 200 and/or any other suitable operating conditions. The disclosed spoiler(s) 102, 202 may then be actuated based upon the measured/determined operating conditions to optimize the performance of the rotor blade 100, 200. For instance, the sensors may be communicatively coupled to the same controller and/or control device as the actuators 130, 230 such that the spoiler(s) 102, 202 may be actuated automatically based on the output from the sensors. Thus, in one embodiment, if the output from the sensors indicates that the wind speeds, root loading and/or root deformation is/are significantly high, the spoilers 102, 202 may be moved to the elevated position in order to separate the airflow from the rotor blade 100, 200 and reduce the loading and/or deformation on the blade root 104. However, it should be appreciated that, in alternative embodiments, the disclosed spoilers 102, 202 need not be controlled based on output(s) from a sensor(s). For example, the spoilers 102, 202 may be moved to the elevated position based on predetermined operating conditions and/or predetermined triggers programmed into the control logic of the turbine controller or other suitable control device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   a shell having a pressure side and a suction side, said shell defining an outer surface along said pressure and suction sides over which an airflow travels; and,
   a spoiler comprising a fixed end and a free end, said fixed end connected to said outer surface so as to enable a hinge action, said free end comprising a top flange and a bottom flange configured to engage opposite sides of said shell,
   wherein said free end is pivotal relative to said fixed end between a recessed position and an elevated position,
   wherein said free end has a range of motion limited by contact of said top flange and said bottom flange with said shell, and
   wherein said free end is configured to separate the airflow from said outer surface when in said elevated position.

2. The rotor blade as in claim 1, wherein said hinge action comprises a living hinge.

3. The rotor blade as in claim 2, wherein said living hinge comprises a laminate material.

4. The rotor blade as in claim 1, wherein said spoiler further comprises a wedge portion, wherein said wedge portion tapers from a front face defined between said top flange and said bottom flange to said fixed end, said front face configured to separate the airflow from said outer surface when said spoiler is in said elevated position.

5. The rotor blade as in claim 1, further comprising an actuator disposed within said shell, said actuator being configured to pivot said free end between said recessed position and said elevated position.

6. The rotor blade as in claim 1, wherein a top side of said spoiler defines an aerodynamic surface generally corresponding to an aerodynamic profile of said outer surface, and wherein said outer surface comprises one or more recesses configured to position said spoiler such that said top side of said spoiler is generally aligned with said outer surface when said spoiler is in a recessed position.

7. The rotor blade as in claim 1, wherein a height is defined between said top flange and said outer surface when said spoiler is in said elevated position, said height ranging from about 1% to about 4% of a chord defined at a span-wise location of said spoiler.

8. The rotor blade as in claim 1, wherein said spoiler is disposed a chord-wise distance from a leading edge of said shell ranging from about 10% to about 50% of a chord defined at a span-wise location of said spoiler.

9. The rotor blade as in claim 1, wherein said spoiler is disposed a span-wise distance from a blade root of said rotor blade from about 50% to about 90% of a span defined by said blade root and a blade tip.

10. The rotor blade as in claim 1, wherein said fixed end is affixed to said outer surface by an adhesive.

11. The rotor blade as in claim 1, further comprising a plurality of spoilers spaced apart along a span of said rotor blade.

12. A rotor blade for a wind turbine, the rotor blade comprising:
    a shell having a pressure side and a suction side, said shell defining an outer surface along said pressure and suction sides over which an airflow travels; and,
    a spoiler comprising a fixed end, a free end, and a wedge portion, said fixed end connected to said outer surface so as to enable a hinge action, said free end comprising a top flange and a bottom flange configured to engage opposite sides of said shell,
    wherein said free end is pivotal relative to said fixed end between a recessed position and an elevated position,
    wherein said wedge portion tapers from a front face defined between said top flange and said bottom flange to said fixed end, and
    wherein said front face is configured to separate the airflow from said outer surface when said spoiler is in said elevated position.

13. A wind turbine comprising:
    a tower;
    a nacelle mounted atop said tower;
    a hub coupled to said nacelle; and
    a plurality of rotor blades extending outwardly from said hub, at least one of said plurality of rotor blades, each blade comprising:
    a shell having a pressure side and a suction side, said shell defining an outer surface along said pressure and suction sides over which an airflow travels; and, a spoiler comprising a fixed end and a free end, said fixed end connected to said outer surface so as to enable a hinge action, said free end comprising a top flange and a bottom flange configured to engage opposite sides of said shell, wherein said free end is pivotal relative to fixed end between a recessed position and an elevated position, and wherein said free end has a range of motion limited by contact of said top flange and said bottom flange with said shell, and wherein said free end is configured to separate the airflow from said outer surface when in said elevated position.

14. The wind turbine as in claim 13, wherein said hinge action comprises a living hinge.

15. The wind turbine as in claim 13, wherein said spoiler further comprises a wedge portion, wherein said wedge portion tapers from a front face defined between said top flange and said bottom flange to said fixed end, said front face configured to separate the airflow from said outer surface when said spoiler is in said elevated position.

16. The wind turbine as in claim 13, further comprising an actuator disposed within said shell, said actuator being configured to pivot said free end between said recessed position and said elevated position.

17. The wind turbine as in claim 13, wherein a top side of said spoiler defines an aerodynamic surface generally corresponding to an aerodynamic profile of said outer surface, and wherein said outer surface comprises one or more recesses configured to position said spoiler such that said top side of said spoiler is generally aligned with said outer surface when said spoiler is in a recessed position.

18. The wind turbine as in claim 17, wherein a height is defined between said top flange and said outer surface when said spoiler is in said elevated position, said height ranging from about 1% to about 4% of a chord defined at a span-wise location of said spoiler.

19. The wind turbine as in claim 13, wherein said spoiler is disposed a chord-wise distance from a leading edge of said shell ranging from about 10% to about 50% of a chord defined at a span-wise location of said spoiler, and wherein said spoiler is disposed a span-wise distance from a blade root of said rotor blade from about 50% to about 90% of a span defined by said blade root and a blade tip.

20. The wind turbine as in claim 13, further comprising a plurality of spoilers spaced apart along a span of said rotor blade.

* * * * *